United States Patent [19]

Guichard

[11] 4,444,071
[45] Apr. 24, 1984

[54] METHOD FOR ASSEMBLING A WORM SCREW MOTOR-REDUCTION GEARBOX COMBINATION WITH A DOUBLE KINEMATIC CHAIN, AND A MOTOR DRIVE REDUCTION GEARBOX COMBINATION RESULTING THEREFROM

[75] Inventor: Roland R. Guichard, Chaource, France

[73] Assignee: Equipments Automobiles Marchal, Issy-les-Moulineaux, France

[21] Appl. No.: 310,924

[22] Filed: Oct. 13, 1981

[30] Foreign Application Priority Data

Oct. 14, 1980 [FR] France .................... 80 21911

[51] Int. Cl.³ .................... F16H 1/16; F16H 1/20; F16H 57/00; B23P 11/00
[52] U.S. Cl. .................... 74/427; 74/410; 74/468; 29/159.2; 29/434
[58] Field of Search .................... 74/427, 424.5, 410, 74/421 A, 425, 458, 457, 10.85, 416; 29/159.2, 434

[56] References Cited

U.S. PATENT DOCUMENTS

| | | | |
|---|---|---|---|
| 791,529 | 6/1905 | Abrey | 74/427 |
| 1,113,172 | 10/1914 | Fassett | 74/427 |
| 1,163,483 | 12/1915 | Sutch | 74/427 |
| 1,551,474 | 8/1925 | Fassett | 74/427 |
| 1,603,557 | 10/1926 | Schleir | 74/427 |
| 2,785,369 | 3/1957 | Ligh | 74/427 |
| 4,282,767 | 8/1981 | Guichard | 74/427 |

FOREIGN PATENT DOCUMENTS

| | | | |
|---|---|---|---|
| 609049 | 11/1960 | Canada | 74/427 |
| 2446839 | 4/1976 | Fed. Rep. of Germany . | |
| 2372998 | 6/1978 | France . | |
| 2430683 | 2/1980 | France . | |
| 2449006 | 9/1980 | France . | |
| 2024983 | 1/1980 | United Kingdom | 74/416 |

*Primary Examiner*—Lawrence J. Staab
*Assistant Examiner*—Michael D. Bednarek
*Attorney, Agent, or Firm*—Brisebois & Kruger

[57] ABSTRACT

A motor-reduction gearbox combination has the driven shaft output gear on the floor of the casing and below the driving shaft which is perpendicular to the driven shaft. The drive shaft has two multi-start corner screw portions of opposite hand and preferably of equal arithmetic pitch, to be engaged by respective pinions. Each pinion forms part of a respective double gear unit by being fixed to, or more preferably formed integrally with, a gearwheel meshing with the driven shaft output gear. For each double gear unit, the ratio of the number of teeth on the gearwheel to the number of teeth on the pinion is equal to the number of thread starts of the associated worm screw portion of the driving shaft, and in the preferred case the double gear units both have the same such ratio.

9 Claims, 1 Drawing Figure

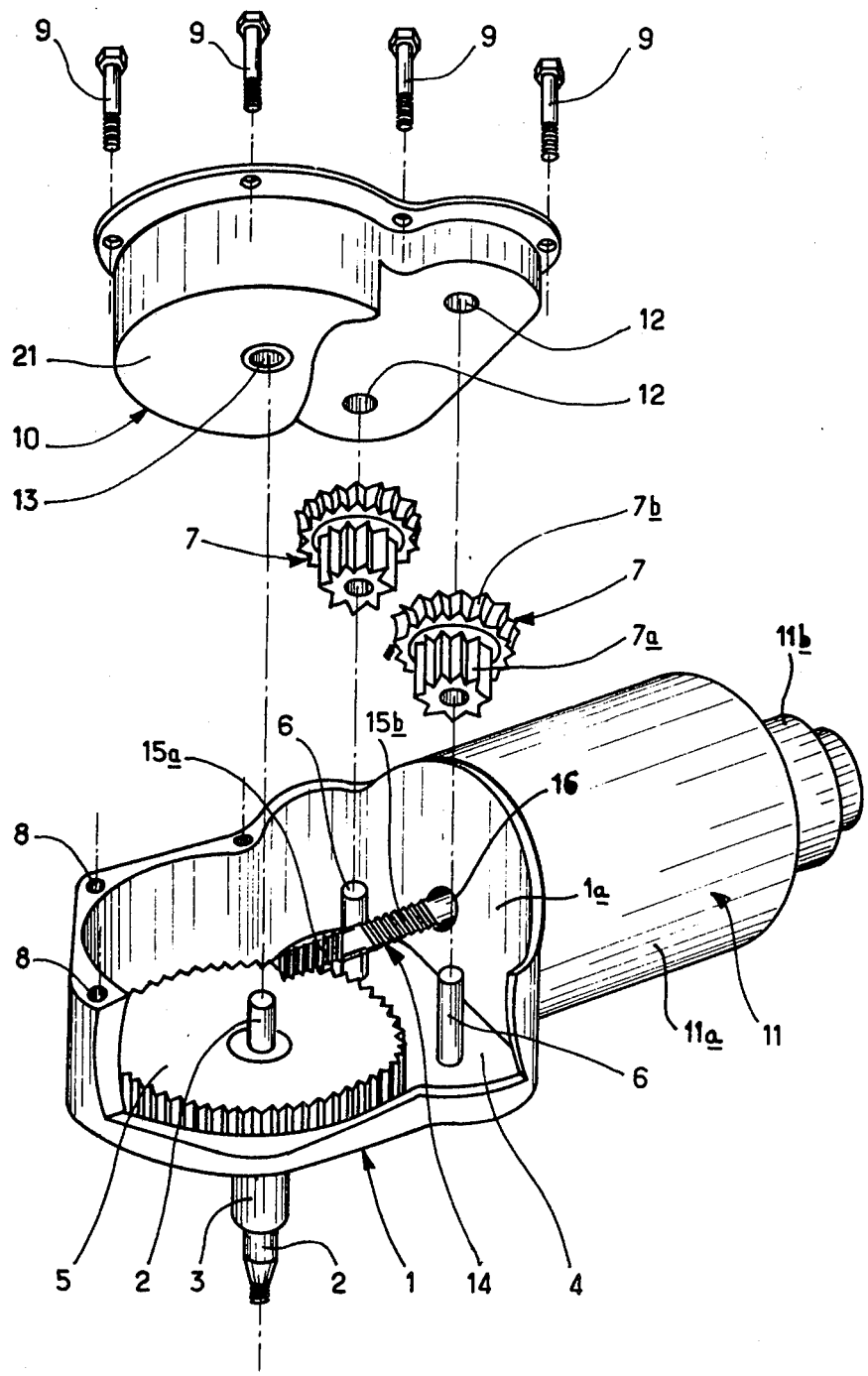

METHOD FOR ASSEMBLING A WORM SCREW MOTOR-REDUCTION GEARBOX COMBINATION WITH A DOUBLE KINEMATIC CHAIN, AND A MOTOR DRIVE REDUCTION GEARBOX COMBINATION RESULTING THEREFROM

DESCRIPTION

BACKGROUND OF THE INVENTION

The present invention concerns a method intended to simplify the assembly of the worm screw drive motor reducer described in French Pat. No. 2372998 filed on the Dec. 2, 1976.

PRIOR ART

In said French Pat. No. 2372998 the driving shaft, which is driven by an electric motor, comprises two worm screws of opposite hand and preferably with the same pitch. The driven shaft, which is perpendicular to the driving shaft, is driven by two distinct kinematic chains, each comprising a double gear.

Such a motor-gearbox combination is particularly worthwhile for driving a windscreen wiper for a motor vehicle. If the driving shaft transmits a driving torque, and the driven shaft is subjected to an opposing load torque, the two opposing worm screw portions of the driving shaft exert opposed tangential stresses of substantially equal values on the two double gears of the two kinematic chains; thus the driving shaft is not subjected to any net axial reaction and it is not necessary to provide it with stops in either axial direction or the other. It has been found that the efficiency of such a motor-gearbox combination was very satisfactory.

For reasons of strength it is preferable for the threads of the two worm screw portions cut on the driving shaft to be shallow in relation to the overall diameter of the shaft. To do this, provision is made for such worm screw portions to have several thread starts, for example two thread starts instead of a single one which allows (a) the depth of the threads to be reduced, (b) the solid core of the two worm screw portions to be increased and (c) the driving shaft to have a better mechanical strength as a result of (a) and (b).

However, making two such worm screw portions with $k_1$ and $k_2$ thread starts, $k_1$ and $k_2$ being integers greater than 1, entails a decrease, by a factor $k_1$ or $k_2$, in the reduction ratio relative to the reduction rates of two worm screw portions each with a single start thread. To offset this decrease, the double gear unit of each of the two kinematic chains is composed of a wheel with n teeth and a pinion with p teeth having a ratio n/p equal to the respective abovementioned factor $k_1$ or $k_2$. The wheel of each double gear meshes with one of the two worm screws of the driving shaft while the associated pinion, having a smaller number p of teeth, meshes with the output gear-wheel carried by the driven shaft.

The assembly of a motor-gearbox combination of this type may be effected as described in the Specification of U.S. Pat. No. 4,282,767 filed on the July 2, 1979. The casing of the motor-gearbox combination, which is intended to accommodate the gears and the worm screw, is integral with the motor whose output shaft then constitutes the driving shaft of the reduction gearbox. Thus the two double gears are placed in the casing within which the driving shaft with the double worm screw portions has been previously positioned and the output wheel carried by the driven shaft is then installed. The casing is then closed by an attached cover which is secured by bolts.

The assembly of the elements of the reduction gearbox in the abovementioned order of installation may prove to be exacting: to make it possible to ensure that the output wheel meshes with the two pinions of p teeth (of the double gear units which co-operate with the two worm screw portions of the driving shaft) it may be necessary to remove one double gear unit in order to modify its angular position so that the output wheel which already meshes with one pinion of p teeth also engages the second such pinion. In fact, the rotation of one tooth of the wheel with n teeth of each double gear entails a rotation of p/n teeth of the associated pinion; it follows therefrom that one has a probability of one chance in $k_1$ or $k_2$ of being able to position the second double gear unit correctly.

BRIEF SUMMARY OF THE INVENTION

It is an object of the present invention to overcome the abovementioned disadvantage.

Accordingly the present invention provides a method for assembling a motor-reduction gearbox combination comprising a casing enclosing a driving shaft having first and second worm screw portions of opposite hand, with $k_1$ and $k_2$ thread starts respectively, $k_1$ and $k_2$ being integers greater than 1; and a driven shaft carrying an output gearwheel and connected to the driving shaft by two distinct kinematic chains, each comprising a double gear unit constituted by a wheel and a pinion which are coaxial and have n and p teeth, respectively, the wheels of the two double gear units co-operating with a respective one of said first and second worm screw portions of the driving shaft, the pinions of the said gear units co-operating with said output gearwheel carried by the driven shaft, the ratio n/p of each double gear unit being equal respectively to the number of thread starts $k_1$ or $k_2$ of the corresponding one of said first and second worm screw portions, such method comprising the step of assembling said double gear units within the casing so that during the assembly operation the pinions of the said double gear units mesh with said output wheel before the wheels of the said double gear units mesh with the two worm screw portions of said driving shaft.

Thus the assembly method according to this invention is effected in a reverse order to that mentioned as prior art. Thus, causing the two double gears to engage on the output wheel no longer causes any difficulty and it is never necessary to change the angular orientation of one of the two double gears to make it possible to ensure that the first and second worm screw portions of the driving shaft mesh with the said gear wheels.

In a preferred mode of implementation of the method, the driven shaft and its associated output gearwheel are positioned within the casing, and then the driving shaft having the double worm screw portions and finally the two double gear units are positioned by meshing the pinions of the said double gear units with the output gearwheel before meshing the gearwheels of the said double gear units with the respective ones of the first and second worm screw portions of the driving shaft.

Advantageously, the casing is closed by means of a cover, the rotor shaft of the motor of the motor-gearbox combination constituting the driving shaft with a double worm screw.

The present invention also provides a motor-reduction gearbox combination including a motor; a casing having a floor; a driving shaft within said casing; means on said driving shaft defining first and second worm screw portions of opposite hand having $k_1$ and $k_2$ thread starts, respectively, $k_1$ and $k_2$ being integers greater than 1; a driven shaft in said casing; an output gearwheel on said driven shaft and in said casing; and first and second kinematic chain means connecting said driven shaft to the driving shaft, each said kinematic chain means comprising a respective double gear unit comprising a wheel having n teeth and a pinion having p teeth, said pinion and wheel being coaxial with one another and fixed against relative rotation with respect to one another; wherein said wheel of the double gear unit of said first kinematic chain means meshes with said first worm screw portion of the driving shaft and the wheel of the said double gear unit of the second kinematic chain means meshes with the second worm screw portion and the pinions of both said kinematic chain means mesh with said output gearwheel carried by the driven shaft, wherein the ratio n/p of said double gear unit of the first kinematic chain means is equal to the integer $k_1$ and the ratio n/p of said double gear unit of the second kinematic chain is equal to the integer $k_2$, and wherein said output gearwheel is arranged in said casing between the driving shaft and the floor of the casing.

In a preferred embodiment of the combination the floor of the casing comprises, on the one hand, two pins around which the respective double gear units are rotatably mounted and, on the other hand, a bearing intended to accommodate the driven shaft.

It is preferable for the motor-reduction gearbox combination to be fitted with an electric motor. The two oppositely handed worm screw portions arranged on the driving shaft advantageously have pitches with the same arithmetic value and the same number of thread starts, and hence the two double gear units will be mutually identical, and advantageously arranged on either side of the driving shaft within the casing.

BRIEF DESCRIPTION OF THE DRAWING

In order that the present invention may more readily be understood there will now be described, by way of a purely illustrative and non-restrictive example, an embodiment shown in the accompanying drawing, in which the sole FIGURE schematically represents an exploded, stripped perspective view of a motor-gearbox combination according to the invention.

PREFERRED METHOD OF CARRYING OUT THE INVENTION

Referring to the drawing, there will be seen the casing 1 of an embodiment of motor-gearbox combination according to the invention. The driven shaft 2 rotates in a bearing 3 arranged at the bottom 4 of the casing. The bearing 3 is extended towards the outside of the casing by a sleeve. The part of the driven shaft 2 projecting from the abovementioned sleeve is, for example, intended to drive the linkage of a windscreen wiper arm for motor vehicles.

The driven shaft 2 carries an output wheel 5 with straight gear teeth.

On the inner side of bottom 4 of the casing are two parallel pins 6, provided in relief. The two identical double gear units 7 are intended to be rotatably carried on the two parallel pins 6. They are each made of one piece and each comprise a pinion 7a and a wheel 7b which are mutually coaxial. The two pinions 7a of the two double gear units have straight gear teeth meshing with the straight gear teeth of the output wheel 5. The two wheels 7b of the two double gears 7 have helical gear teeth.

In this example, the ratio n/p of the pair (wheel 7b—pinion 7a) of each double gear unit 7 is equal to 2; this ratio is obtained by providing the pinion 7a with fifteen teeth and the wheel 7b with thirty teeth.

In the corners of the casing 1, are tapped holes 8 intended to accommodate bolts 9 for fastening a cover 10 on the casing 1. Three bores 12, 13 are arranged on the bottom 21 of the cover. The two bores 12 are intended to accommodate those parts of the pins 6 which project above the two double gear units 7 when the casing 1 is closed by cover 10. The bore 13 forms the second journal bearing of the driven shaft 2.

The end 1a of the casing 1 constitutes the front plate of the electric motor 11 constituting the drive source of the motor-reduction gearbox combination. The rotor of the electric motor 11 is provided with a shaft 14 projecting into the casing 1 via a journal bearing 16.

The shaft 14 of the rotor constitutes the driving shaft of the reduction gearbox. On its part projecting inside the casing 1, it comprises successively two worm screw portions 15a, 15b of opposite hand but having the same pitch value; they each comprise two thread starts. The helically geared wheels 7b of the two double gear units 7 mesh with the thread of the two worm screw portions 15a, 15b. The two double gear units 7 are arranged to either side of the driving shaft 14.

The assembly of the motor-reduction gearbox assembly is effected as follows: First of all the driven shaft 2 which carries the output wheel 5 is positioned within bearing 3 in the bottom of casing 1. Then the rotor of the electric motor 11 is mounted by inserting its rotor shaft 14 within the journal bearing 16. The installation of the electric motor 11 is completed by assembling the stator 11a and the rear end cap 11b.

The two double gear units 7, which are dimensioned in such a way that the wheels 7a of the said gear units mesh with the output wheel 5 before the wheels 7b mesh with the two worm screws 15a, 15b, are then assembled around the two pins 6. The engagement of the two double gear units 7 on the output wheel 5 and then on the two worm screws 15a, 15b of the driving shaft, is in all cases effected without the need to remove the double gear unit to change its angular orientation.

The assembly of the motor gearbox combination is then completed by closing casing 1 with the cover 10 which is suitably orientated so as to accommodate the ends of the two pins 6 and the end of the driven shaft 2 within the bores 12 and 13 respectively. The thus-positioned cover 10 is fixed on casing 1 by means of the bolts 9.

It shall be duly understood that the embodiment described above is in no way restrictive, and may give rise to any desirable modification without thereby departing from the scope of the invention as defined by the following statement of claim.

I claim:

1. A method for assembling a motor-reduction gearbox combination comprising a casing enclosing a driving shaft having first and second worm screw portions of opposite hand, with $k_1$ and $k_2$ thread starts respectively, $k_1$ and $k_2$ being integers greater than 1; and a driven shaft carrying an output gearwheel and connected to the driving shaft by two distinct kinematic chains, each comprising a double gear unit constituted by a wheel and a pinion which are coaxial and have n and p teeth, respectively, the wheels of the two double gear units co-operating with a respective one of said first and second worm screw portions of the driving shaft, the pinions of the said gear units co-operating with said output gearwheel carried by the driven shaft, the ratio n/p of each double gear unit being equal respectively to the number of thread starts $k_1$ or $k_2$ of the corresponding one of said first and second worm screw portions, such method comprising the step of assembling said double gear units within the casing so that during the assembly operation the pinions of the said double gear units mesh with said output wheel before the wheels of the said double gear units mesh with the two worm screw portions of said driving shaft.

2. A method according to claim 1, comprising the steps of positioning the driven shaft and its associated output wheel within the casing, then positioning the driving shaft with the double worm screw within the casing, and finally positioning the two double gear units, by engaging said pinions of said double gear units on said output wheel before engaging the wheels of the said double gear units on said first and second worm screw portions of said driving shaft.

3. A method according to claim 1 or claim 2, wherein said casing is integral with the motor of the motor-reduction gearbox combination and is closed by means of a cover, the output shaft of the said motor constituting said driving shaft having said first and second worm screw portions.

4. A motor-reduction gearbox combination including a motor; a casing having a floor; a driving shaft within said casing; means on said driving shaft defining first and second worm screw portions of opposite hand having $k_1$ and $k_2$ thread starts, respectively, $k_1$ and $k_2$ being integers greater than 1; a driven shaft in said casing; an output gearwheel on said driven shaft and in said casing; and first and second kinematic chain means connecting said driven shaft to the driving shaft, each said kinematic chain means comprising a respective double gear unit comprising a wheel having n teeth and a pinion having p teeth, said pinion and wheel being coaxial with one another and fixed against relative rotation with respect to one another; wherein said wheel of the double gear unit of said first kinematic chain means meshes with said first worm screw portion of the driving shaft and the wheel of the said double gear unit of the second kinematic chain means meshes with the said second worm screw portion and the pinions of both said kinematic chain means mesh with said output gearwheel carried by the driven shaft, wherein the ratio n/p of said double gear unit of the first kinematic chain means is equal to the integer $k_1$ and the ratio n/p of said double gear unit of the second kinematic chain is equal to the integer $k_2$, and wherein said output gearwheel is arranged in said casing between the driving shaft and the floor of the casing.

5. A motor-reduction gearbox combination according to claim 4, including first and second pins upstanding from said floor of the casing for rotatably supporting said two double gear units, and a bearing fastened to said floor of the casing and intended to accommodate the driven shaft which extends through said casing floor.

6. A motor-reduction gearbox combination according to claim 4, wherein said motor is an electric motor.

7. A motor-reduction gearbox combination according to any one of claims 4 to 6, wherein said first and second worm screw portions of the driving shaft have pitches of the same arithmetic value and the same number of thread starts, and the two double gear units are mutually identical.

8. A motor-reduction gearbox combination according to any one of claims 4 to 6, wherein said two double gear units are arranged within said casing on either side of the driving shaft.

9. A motor-reduction gearbox combination according to any one of claims 4 to 6, wherein said driven shaft is connected to a vehicle windscreen wiper drive linkage.

* * * * *